United States Patent
Hori et al.

(10) Patent No.: US 11,626,100 B2
(45) Date of Patent: Apr. 11, 2023

(54) INFORMATION PROCESSING APPARATUS, INFORMATION PROCESSING METHOD, AND RECORDING MEDIUM

(71) Applicant: TOYOTA JIDOSHA KABUSHIKI KAISHA, Toyota (JP)

(72) Inventors: Takashige Hori, Aisai (JP); Kouji Nishiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 17/163,633

(22) Filed: Feb. 1, 2021

(65) Prior Publication Data
US 2021/0248994 A1 Aug. 12, 2021

(30) Foreign Application Priority Data
Feb. 10, 2020 (JP) .............................. JP2020-020577

(51) Int. Cl.
*G10L 15/00* (2013.01)
*G06F 3/16* (2006.01)
*G06F 40/58* (2020.01)

(52) U.S. Cl.
CPC .............. *G10L 15/005* (2013.01); *G06F 3/16* (2013.01); *G06F 40/58* (2020.01)

(58) Field of Classification Search
CPC . G10L 15/005; G10L 15/22; G10L 2015/223; G06F 3/16; G06F 40/58; G06F 3/167; G06F 40/40; G06F 40/30; G01C 21/00
See application file for complete search history.

(56) References Cited

U.S. PATENT DOCUMENTS

| | | | |
|---|---|---|---|
| 10,102,201 B2* | 10/2018 | Mohajer | G06Q 20/102 |
| 10,579,742 B1* | 3/2020 | Fernandez | G10L 15/16 |
| 10,891,435 B1* | 1/2021 | Ruiz | G06F 40/30 |
| 2009/0024595 A1 | 1/2009 | Chen | |
| 2011/0137926 A1 | 6/2011 | Chen | |
| 2013/0304451 A1 | 11/2013 | Sarikaya et al. | |
| 2014/0180670 A1* | 6/2014 | Osipova | G06V 20/20 704/3 |
| 2014/0272821 A1* | 9/2014 | Pitschel | G09B 19/06 434/157 |
| 2018/0089172 A1* | 3/2018 | Needham | H04L 67/306 |

(Continued)

FOREIGN PATENT DOCUMENTS

| | | |
|---|---|---|
| JP | 2000-010999 A | 1/2000 |
| JP | 2008-096289 A | 4/2008 |

(Continued)

*Primary Examiner* — Pierre Louis Desir
*Assistant Examiner* — Keisha Y. Castillo-Torres
(74) *Attorney, Agent, or Firm* — Oblon, McClelland, Maier & Neustadt, L.L.P.

(57) ABSTRACT

An information processing apparatus includes a controller that is configured to identify a first language into which a content of a speech that is input is to be translated, based on first information about a place, estimate an intention of the content of the speech based on the content of the speech that is translated into the first language, select a service to be provided, based on the intention that is estimated, and provide a guide related to the service that is selected, in a language of the speech. The first language is different from the language of the speech.

6 Claims, 5 Drawing Sheets

(56) References Cited

U.S. PATENT DOCUMENTS

| | | | | |
|---|---|---|---|---|
| 2018/0322870 A1* | 11/2018 | Lee | .................... | H04N 21/4394 |
| 2019/0108836 A1* | 4/2019 | Kato | ........................ | G10L 15/22 |
| 2019/0392325 A1* | 12/2019 | Lange | ....................... | G06N 5/02 |
| 2020/0211417 A1* | 7/2020 | Huang | .................... | G10L 15/26 |

FOREIGN PATENT DOCUMENTS

| | | | | |
|---|---|---|---|---|
| JP | 2010-534378 A | 11/2010 | | |
| JP | 2015-523623 A | 8/2015 | | |
| JP | 2020-013594 A | 1/2020 | | |
| WO | WO-2019172946 A1 * | 9/2019 | ......... | G06F 16/3329 |

* cited by examiner

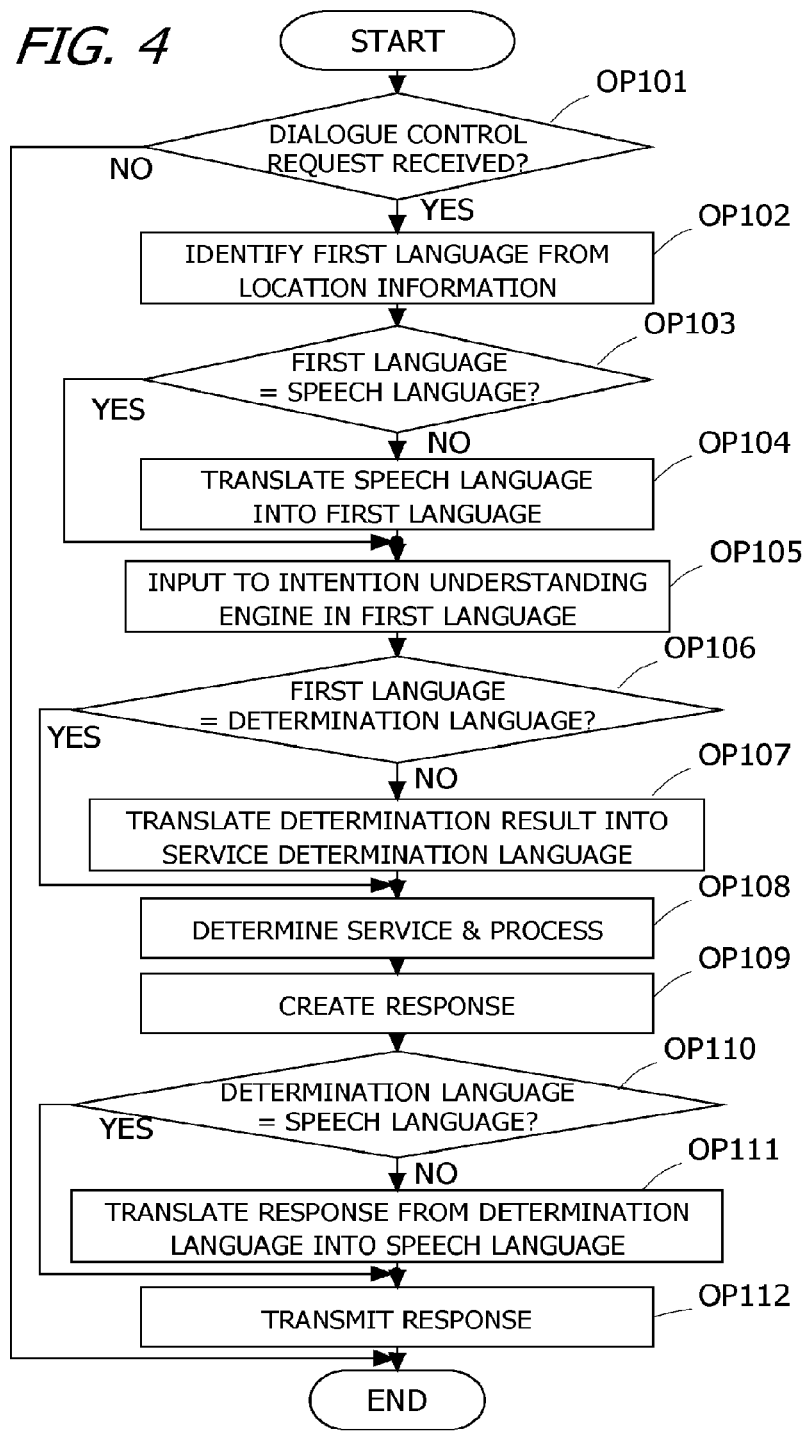

FIG. 5

SPEECH LANGUAGE: ENGLISH
SERVICE DETERMINATION LANGUAGE: JAPANESE

| | | |
|---|---|---|
| OP101 | INPUT SPEECH AUDIO | REGISTER LEPANTO SCHEDULE FROM 10:00 TOMORROW (ENGLISH: TEXT) |
| OP102 | IDENTIFY FIRST LANGUAGE | FIRST LANGUAGE = ITALIAN |
| OP103 | SPEECH LANGUAGE = FIRST LANGUAGE? | SPEECH LANGUAGE (ENGLISH) ≠ FIRST LANGUAGE (ITALIAN) |
| OP104 | TRANSLATE INTO FIRST LANGUAGE | REGISTRA IL PROGRAMMA LEPANTO DALLE 10:00 DOMANI (ITALIAN) |
| OP105 | INPUT TO INTENTION UNDERSTANDING ENGINE IN FIRST LANGUAGE | REGISTRA \| IL \| PROGRAMMA \| LEPANTO \| DALLE \| 10:00 DOMANI ★ \| ARTICLE \| ★ \| TITLE \| POSTPOSITIONAL PARTICLE \| START DATE/TIME |
| OP106 | DETERMINATION LANGUAGE = FIRST LANGUAGE? | DETERMINATION LANGUAGE (JAPANESE) ≠ FIRST LANGUAGE (ITALIAN) |
| OP107 | TRANSLATE INTO DETERMINATION LANGUAGE | 登録\|その\|予定\|LEPANTO \|から\|明日の10:00 ★ \| ARTICLE \| ★ \| TITLE \| POSTPOSITIONAL PARTICLE \| START DATE/TIME |
| OP108 | DETERMINE SERVICE & PROCESS | SCHEDULER REGISTRATION (REGISTER SCHEDULE FOR LEPANTO, TOMORROW AT 10:00) |
| OP109 | CREATE RESPONSE | 明日の予定を登録しました(TEXT) |
| OP110 | SPEECH LANGUAGE = DETERMINATION LANGUAGE? | SPEECH LANGUAGE (ENGLISH) ≠ DETERMINATION LANGUAGE (JAPANESE) |
| OP111 | TRANSLATE INTO SPEECH LANGUAGE | REGISTERED TOMORROW'S SCHEDULE (TEXT) |
| OP112 | TRANSMIT | |

INFORMATION PROCESSING APPARATUS, INFORMATION PROCESSING METHOD, AND RECORDING MEDIUM

CROSS REFERENCE TO RELATED APPLICATION

This application claims the benefit of Japanese Patent Application No. 2020-020577, filed on Feb. 10, 2020, which is hereby incorporated by reference herein in its entirety.

BACKGROUND

Technical Field

The present disclosure relates to an information processing apparatus, an information processing method, and a recording medium.

Description of the Related Art

There is disclosed a multilingual navigation device that includes map information and audio guide information in a plurality of languages, and that performs navigation control using the map information and the audio guide information in a used language that is set in a mobile phone terminal (for example, Patent document 1).

CITATION LIST

Patent Document

[Patent document 1] Japanese Patent Laid-Open No. 2008-096289

However, for example, in the case where a plurality of languages are used in a mixed manner in a user's speech, the accuracy of understanding of an intention of the speech may be reduced when map information and audio guide information in a language that is set in a mobile terminal or in a language of the speech are used.

An object of an aspect of the disclosure is to provide an information processing apparatus, an information processing method, and a recording medium that are capable of increasing the accuracy of understanding of an intention of a speech's content.

SUMMARY

One of aspects of the present disclosure is an information processing apparatus including a controller that is configured to:
identify a first language into which a content of a speech that is input is to be translated, based on first information about a place,
estimate an intention of the content of the speech based on the content of the speech that is translated into the first language,
select a service to be provided, based on the intention that is estimated, and
provide a guide related to the service in a language of the speech.

Another aspect of the present disclosure is an information processing method including:
identifying a first language into which a content of a speech that is input is to be translated, based on first information about a place,
estimating an intention of the content of the speech based on the content of the speech that is translated into the first language,
selecting a service to be provided, based on the intention that is estimated, and
providing a guide related to the service in a language of the speech.

Another aspect of the present disclosure is a computer-readable non-transitory recording medium recorded with a program for causing a computer to:
transmit, to a server, a content of a speech that is input, and
receive a guide related to a service in a language of the speech, the guide being transmitted from the server that is configured to translate the content of the speech into a first language that is identified based on first information about a place, estimate an intention of the content of the speech based on the content of the speech that is translated into the first language, and select the service based on the intention that is estimated.

According to the present disclosure, accuracy of understanding of an intention of a speech's content may be increased.

BRIEF DESCRIPTION OF DRAWINGS

FIG. 4 is an example of a flowchart of a dialogue control process by the center server; and FIG. 5 is a diagram illustrating a specific example of the dialogue control process.

DESCRIPTION OF THE EMBODIMENTS

Figure 1:
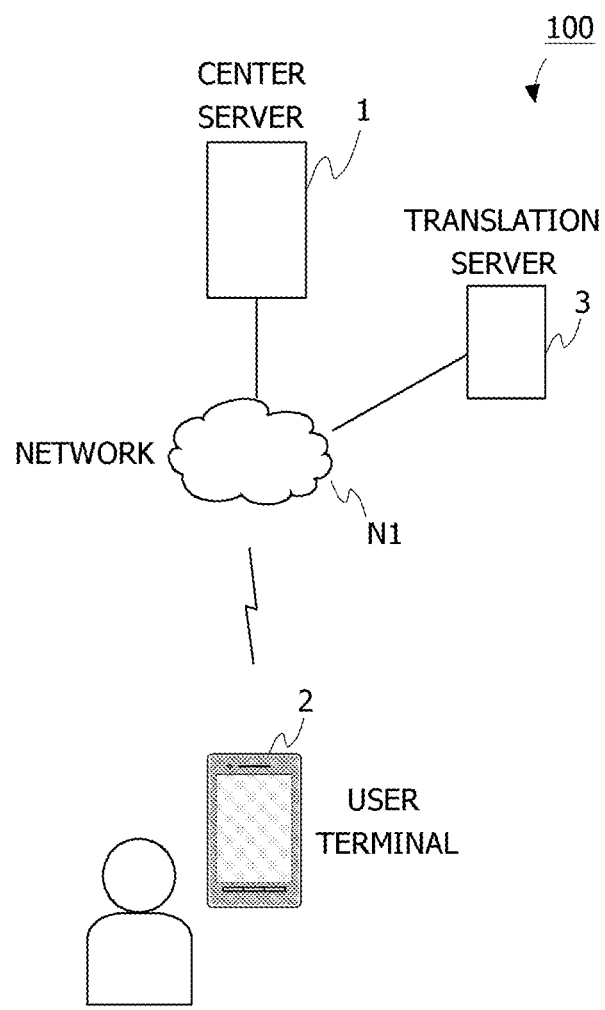
FIG. 1 is a diagram illustrating an example of a system configuration of a dialogue control system according to a first embodiment.

At a time of issuing a command to a device by voice, an intention understanding engine is used in many cases so that an intention of a speech that is input is understood, for example. In many cases, one intention understanding engine corresponds to one language. However, a speech may contain a plurality of languages. For example, during a stay in a foreign country, a commonly used local name of a place in the country of stay gets mixed in a mother tongue. Normally, the intention understanding engine corresponding to the language of a speech is used, but in the case where a plurality of languages are mixed in a speech, it is often difficult to accurately understand the intention.

According to one aspect of the present disclosure, an information processing apparatus translates a content of a speech into a first language based on first information that is associated with a place that is related to the speech, and estimates an intention of the content of the speech based on the content of the speech that is translated into the first language.

Specifically, an aspect of the present disclosure is an information processing apparatus including a controller configured to identify a first language into which a content of a speech that is input is to be translated, based on first information that is associated with a place that is related to the speech, estimate an intention of the content of the speech based on the content of the speech that is translated into the first language, select a service to be provided, based on the intention that is estimated, and provide a guide related to the service in a language of the speech. The first language is different from the language of the speech.

The information processing apparatus is a server, for example. However, the information processing apparatus is not limited to a server, and may be a smartphone, a tablet terminal, a personal computer (PC), or a user terminal of a car navigation system, for example. The controller is a processor, for example. The first information that is associated with a place that is related to a speech is location information of a device to which the speech is input, and information indicating a preference, regarding a place, of a user of the device to which the speech is input. The device to which the speech is input and the information processing apparatus may be the same device. The information indicating a preference, regarding a place, of a user of the device to which the speech is input is a ranking of appearances of countries in at least one of a search history, schedule information, or a record of delivered information.

For example, in the case where the first information is the location information of the device to which the speech is input, the first language is a used language of a country indicated by the location information. For example, in the case where the first information is the ranking of appearances of countries in a search history of the user of the device to which the speech is input, the first language is a used language of a country ranking first in the ranking.

An intention understanding engine may be used to estimate the intention of the content of the speech, for example. The information processing apparatus may use an intention understanding engine corresponding to the first language to estimate the intention of the content of the speech.

According to an aspect of the present disclosure, the intention of the content of the speech is estimated based on the content of the speech that is translated into the first language that is identified based on the first information about a place. Accordingly, for example, in the case where a plurality of languages are used in a mixed manner in the content of the speech and there is a word unique to the first language, the intention of the speech may be more accurately understood.

In the following, an embodiment of the present disclosure will be described with reference to the drawings. The configuration of the embodiment described below is an example, and the present disclosure is not limited to the configuration of the embodiment.

First Embodiment

FIG. 1 is a diagram illustrating an example of a system configuration of a dialogue control system 100 according to a first embodiment. The dialogue control system 100 is a system that recognizes a voice of a user, and that provides, according to an instruction regarding a process included in the voice, a service of performing the process. For example, the dialogue control system 100 includes a center server 1, a user terminal 2, and a translation server 3. The center server 1, the user terminal 2, and the translation server 3 are each connected to a network N1, and are capable of communication through the network N1.

The user terminal 2 is a smartphone, a tablet terminal, a PC, or an in-vehicle device such as a car navigation system, for example. A dialogue control application for providing an interface for a service of performing a process according to a voice including an instruction regarding the process is installed in the user terminal 2, for example. The user terminal 2 converts speech audio input from a user through the dialogue control application into text, and transmits a speech content converted into text and a dialogue control request to the center server 1, for example. In the first embodiment, location information of the user terminal 2 is also transmitted to the center server 1, together with the dialogue control request.

In response to the dialogue control request received from the user terminal 2, the center server 1 recognizes an instruction for a process based on the speech content, and provides a service of performing the process. Specifically, the center server 1 analyzes the content of the speech received from the user terminal 2 by the intention understanding engine, identifies and executes an instruction for the process included in the content of the speech, and transmits an execution result to the user terminal 2. Transmission of the execution result of a process to the user terminal 2 is an example of "providing a guide" "related to a service".

In the first embodiment, before inputting the content of the speech in the intention understanding engine, the center server 1 determines whether the first language that is the used language of the country indicated by the location information of the user terminal 2 and the language of the speech are the same or not. In the case where the first language and the language of the speech are different, the center server 1 translates the content of the speech into the first language, and analyzes the content of the speech after translation into the first language by an intention understanding engine corresponding to the first language. The center server 1 uses an external translation server 3 for translation. The translation server 3 translates specified data into a language specified by the center server 1.

For example, during a trip to a foreign country, the language of the speech and the used language of the country indicated by the location information of the user terminal 2 may be different. At the time of using a service of the dialogue control system 100 at a travel destination, if the speech content includes a word unique to the travel destination country, the intention is possibly not accurately understood with an intention understanding engine in the language of the speech. A word unique to the travel destination country is a commonly used name of a sightseeing spot, the name of a food or a dish unique to the country, or a dialect used in a local area of the country, for example. Accordingly, in the first embodiment, the content of the speech is translated into the used language of the travel destination country, and the content of the translated speech is analyzed by the intention understanding engine in the used language of the travel destination country. This allows a word that is not fully comprehensible in the language of the speech to be understood, or a word indicating the intention of the speech to be prevented from being missed, and the accuracy of understanding of the intention of the speech may be increased.

Figure 2:
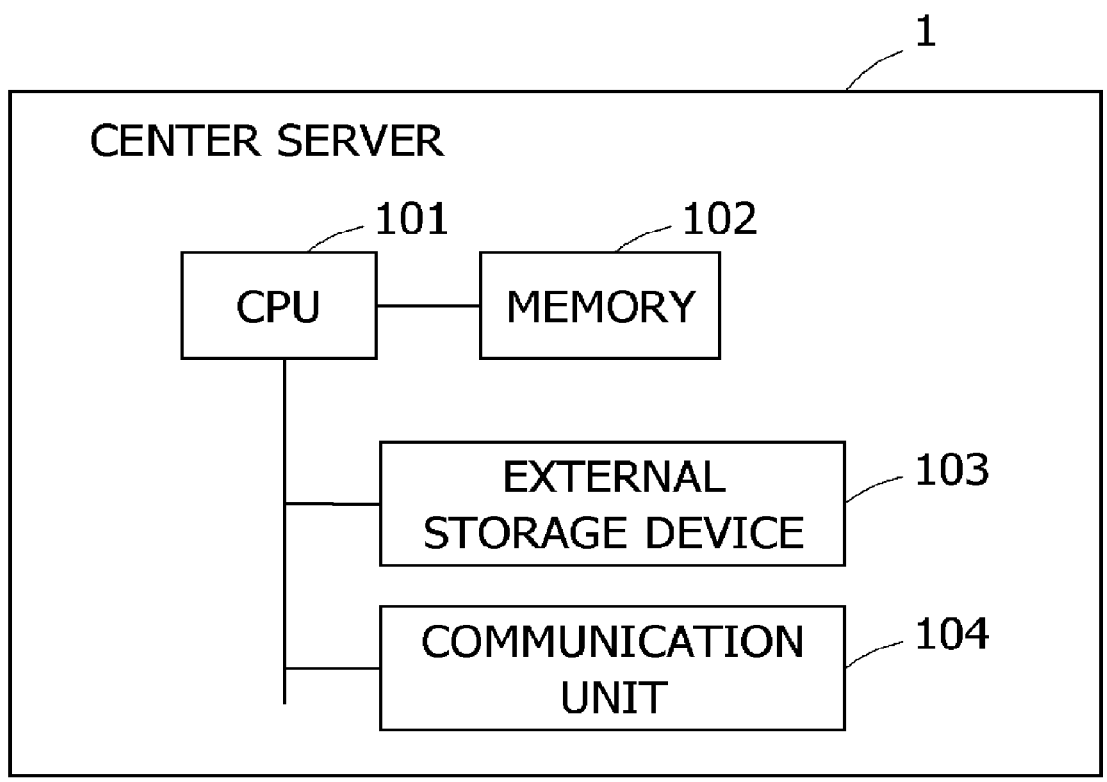
FIG. 2 is a diagram illustrating an example of a hardware configuration of the center server.

FIG. 2 is a diagram illustrating an example of a hardware configuration of the center server 1. As the hardware configuration, the center server 1 includes a central processing unit (CPU) 101, a memory 102, an external storage device 103, and a communication unit 104. The memory 102 and the external storage device 103 are each a computer-readable recording medium. The center server 1 is an example of an "information processing apparatus".

The external storage device 103 stores various programs, and data that is used by the CPU 101 at the time of execution of each program. For example, the external storage device 103 is an erasable programmable ROM (EPROM) or a hard disk drive. Programs held in the external storage device 103 include the operating system (OS), a dialogue control program, and various other application programs, for example. The dialogue control program is a program for recognizing an instruction regarding a process from the content of a speech, and for executing the process.

The memory 102 is a main memory that provides, to the CPU 101, a storage area and a work area for loading the programs stored in the external storage device 103, and that is used as a buffer. The memory 102 includes semiconductor memories such as a read only memory (ROM) and a random access memory (RAN), for example.

The CPU 101 performs various processes by loading the OS and various application programs held in the external storage device 103 into the memory 102 and executing the same. The number of CPUs 101 is not limited to one, and a plurality of CPUs may be provided. The CPU 101 is an example of a "controller" of an "information processing apparatus".

The communication unit 104 is an interface through which information is input/output from a network. The communication unit 104 may be an interface that connects to a cable network, or may be an interface that connects to a wireless network. For example, the communication unit 104 is a network interface card (NIC) or a wireless circuit. Additionally, the hardware configuration of the center server 1 is not limited to the one illustrated in FIG. 2.

Additionally, like the center server 1, the user terminal 2 also includes a CPU, a memory, an external storage device, and a communication unit, but illustration thereof is omitted. For example, the dialogue control application and an audio-text conversion application are installed in the user terminal 2, and the content of a speech obtained by converting audio data of the speech into text data and the dialogue control request are transmitted to the center server 1 by execution of the applications. Additionally, in the case where the user terminal 2 does not include the audio-text conversion application, the audio data of the speech may be transmitted. Furthermore, the user terminal 2 includes location information acquisition means such as a global positioning system (GPS) receiving unit, and transmits the location information to the center server 1, together with the dialogue control request.

Figure 3:
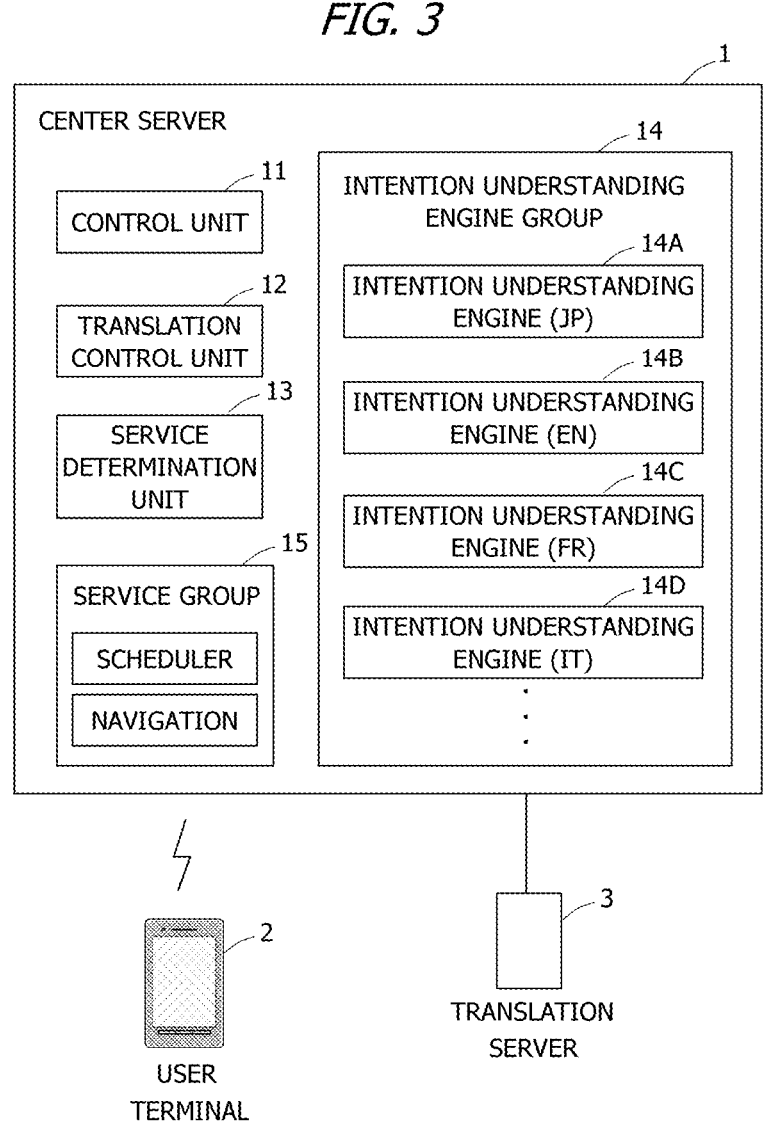
FIG. 3 is a diagram illustrating an example of a functional configuration of the center server.

FIG. 3 is a diagram illustrating an example of a functional configuration of the center server 1. As functional structural elements, the center server 1 includes a control unit 11, a translation control unit 12, a service determination unit 13, an intention understanding engine group 14, and a service group 15. These functional structural elements are implemented by the CPU 101 of the center server 1 executing predetermined programs, for example.

The control unit 11 receives, from the user terminal 2, the dialogue control request, the text data of the content of the speech, and the location information. Additionally, in the case where the content of the speech from the user terminal 2 is audio data, the control unit 11 may convert the audio data into text data. Additionally, conversion of audio data into text data may be performed by the center server 1, or an external server may be requested to perform such conversion.

The control unit 11 identifies, from the location information, the first language that is the used language of the country where the user terminal 2 is located. In the case where the first language and the language of the speech are different, the control unit 11 instructs the translation control unit 12 to translate the text data of the content of the speech from the language of the speech into the first language.

When input of text data of the content of the speech after translation into the first language is received from the translation control unit 12, the control unit 11 outputs the text data to the intention understanding engine corresponding to the first language. When input of an analysis result of the content of the speech is received from the intention understanding engine, the control unit 11 outputs the analysis result to the service determination unit 13, and requests the service determination unit 13 to determine the service to be provided.

Additionally, in the first embodiment, the service determination unit 13 corresponds to one language. Therefore, before inputting the analysis result of the content of the speech to the service determination unit 13, the control unit 11 determines whether a used language of the service determination unit 13 and the first language are the same or not. The used language of the service determination unit 13 will be hereinafter referred to as a service determination language. The service determination language is an example of a "second language".

In the case where the service determination language and the first language are different, the control unit 11 translates, by the translation control unit 12, the analysis result of the content of the speech in the first language into the service determination language, and outputs the content of the speech that is translated into the service determination language to the service determination unit 13. Additionally, in the case where the service determination unit 13 is prepared for each of a plurality of languages, the service determination unit 13 corresponding to the first language may be selected and the analysis result of the content of the speech that is translated into the first language may be input to the service determination unit 13.

When the service that is to be provided is determined by the service determination unit 13, the control unit 11 instructs the service to perform a process according to the content of the speech. When input of a result of the process by the service is received, the control unit 11 creates a response for the user terminal 2. The response is created in the service determination language. In the case where the service determination language and the language of the speech are different, the response is translated into the language of the speech. Additionally, the response is created as text data. The control unit 11 transmits the created response to the user terminal 2.

In response to the instruction from the control unit 11, the translation control unit 12 requests the translation server 3 to translate specified data into a specified language, and acquires translated data from the translation server 3. The translation control unit 12 outputs the translated data that is acquired to the control unit 11.

The service determination unit 13 determines the service intended by the content of the speech, according to the instruction from the control unit 11. For example, the service determination unit 13 corresponds to one language. Additionally, in the first embodiment, only one service determination unit 13 is provided, and thus, in the case where the first language and the service determination language are different, the content of the speech that is translated into the first language is input to the service determination unit 13 after being translated again into the service determination language.

The intention understanding engine group 14 includes an intention understanding engine 14A corresponding to Japanese, an intention understanding engine 14B corresponding to English, an intention understanding engine 14C corresponding to French, and an intention understanding engine 14D corresponding to Italian, for example. Each intention understanding engine includes various dictionary databases for the respective language, and estimates the intention of the content of a speech by referring to the databases. The dictionary databases held by the intention understanding engine may be, but not limited to, a dictionary database for facility names, building names and the like, a dictionary database for dialects in local areas, and a dictionary database for slang, for example.

Specifically, the intention understanding engine performs, for input text data, morphological analysis of breaking down into words and tagging each word. To tag each word indicates to classify the word into a word class or the like, for example. Moreover, the intention understanding engine extracts, from the input text data, a task that is an operation desired by the user, and a word corresponding to a slot in which information that is a parameter for the task is stored. Service determination is performed based on the task and the information in the slot.

The service group 15 includes applications of a plurality of services to be provided by the center server 1. For example, the service group 15 includes applications such as scheduler and navigation.

Additionally, the functional configuration of the center server 1 illustrated in FIG. 3 is merely an example and is not restrictive. Furthermore, the functional structural elements of the center server 1 may be implemented by hardware such as a field programmable gate array (FPGA).

FIG. 4 is an example of a flowchart of a dialogue control process by the center server 1. The process illustrated in FIG. 4 is repeated every predetermined period of time, for example. The performer of the process illustrated in FIG. 4 is the CPU 101 of the center server 1, but a description will be given taking functional structural elements as the performer for the sake of convenience.

In OP101, the control unit 11 determines whether a dialogue control request is received from the user terminal 2 or not. In the case where a dialogue control request is received (OP101: YES), the process proceeds to OP102. In the case where a dialogue control request is not received (OP101: NO), the process illustrated in FIG. 4 is ended. The text data of the content of a speech and location information are received together with the dialogue control request.

In OP102, the control unit 11 identifies the country where the user terminal 2 is located, from the location information of the user terminal 2, and identifies the used language of the country as the first language. In OP103, the control unit 11 determines whether the first language and the language of the speech match or not. The language of the speech is determined by a character code of the text data or the like, for example. In the case where the first language and the language of the speech match (OP103: YES), the process proceeds to OP105. In the case where the first language and the language of the speech do not match (OP103: NO), the process proceeds to OP104.

In OP104, the control unit 11 instructs the translation control unit 12 to cause the translation server 3 to translate the content of the speech into the first language. In OP105, the control unit 11 inputs the content of the speech after translation into the first language to the intention understanding engine corresponding to the first language, and causes analysis to be performed.

In OP106, the control unit 11 determines whether the first language and the service determination language match or not. In the case where the first language and the service determination language match (OP106: YES), the process proceeds to OP108. In the case where the first language and the service determination language do not match (OP106: NO), the process proceeds to OP107.

In OP107, the control unit 11 instructs the translation control unit 12 to cause the translation server 3 to translate an analysis result of the content of the speech from the intention understanding engine in the first language into the service determination language. In OP108, the control unit 11 inputs the analysis result of the speech content in the service determination language to the service determination unit 13 so that the service intended by the content of the speech is determined, and performs a process. In OP109, the control unit 11 creates, in the service determination language, a response including a result of the process by the service.

In OP110, the control unit 11 determines whether the service determination language and the language of the speech match or not. In the case where the service determination language and the language of the speech match (OP110: YES), the process proceeds to OP112. In the case where the service determination language and the language of the speech do not match (OP110: NO), the process proceeds to OP111. In OP111, the control unit 11 instructs the translation control unit 12 to cause the translation server 3 to translate the content of the response into the language of the speech.

In OP112, the control unit 11 transmits the response that is translated into the language of the speech to the user terminal 2. The process in OP112 is an example of "provide a guide related to the service in a language of the speech". Then, the process illustrated in FIG. 4 is ended.

Additionally, the dialogue control process by the center server 1 is not limited to the example illustrated in FIG. 4. For example, in the case where a used language is set for each service in the service group 15, the service processing in OP108 may be performed in the set language.

FIG. 5 is a diagram illustrating a specific example of the dialogue control process. The specific example illustrated in FIG. 5 takes English as the language of the speech, and Japanese as the service determination language. FIG. 5 illustrates the content of a speech or the content of a process according to each process of the flowchart of the dialogue control process illustrated in FIG. 4.

In OP101, the center server 1 receives a dialogue control request, text data indicating the content of a speech "Register Lepanto schedule from 10:00 tomorrow", and the location information of the user terminal 2. It is assumed that the location information of the user terminal 2 indicates Italy. Additionally, due to the sentence being that of a speech, grammar and the like are possibly not correct. Additionally, "Lepanto" in the content of the speech is Italian, and refers to a station in Italy.

In OP102, because the location information of the user terminal 2 indicates Italy, the center server 1 identifies Italian as the first language.

In OP103, because the language of the speech is English and the first language is Italian, the center server 1 determines that the language of the speech and the first language do not match (OP103: NO).

In OP104, the center server 1 causes the translation server 3 to translate the content of the speech into Italian, which is the first language. As a result, text data "Registra il programma Lepanto dalle 10:00 domani" in Italian is acquired.

In OP105, the center server 1 inputs the content of the speech that is translated into Italian to the intention understanding engine 14D in Italian, and causes analysis to be performed. Then, morphological analysis is performed and "Registra|il|programma|Lepanto|dalle|10:00 domani" is obtained. "|" indicates a division between morphemes as a result of the morphological analysis. The intention understanding engine 14D further adds tags "★| article|★| title| postpositional particle|start date/time" to respective words. Additionally, "★" is a tag indicating that the word indicates a task. That is, in the example illustrated in FIG. 5, "Registra" and "programma" (register schedule) are extracted as tasks. Furthermore, "title" and "start data/time" are given as slots for the tasks "Registra" and "programma", and are tagged, respectively, to "Lepanto" and "10:00 domani" in the content of the speech.

In OP106, because the service determination language is Japanese and the first language is Italian, the center server 1 determines that the service determination language and the first language do not match (OP106: NO).

In OP107, the center server 1 causes the translation server 3 to translate the content of the speech that is translated into the first language into Japanese, which is the service determination language. As a result, text data in Japanese, "登録|その|予定 |Lepanto|から|明日の 10:00 (toroku|sono|y-otei|Lepanto|kara|asu no 10:00)", is acquired. Additionally, "Lepanto" is a parameter corresponding to the slot "title", and is thus excluded from a target of translation into the service determination language. However, depending on the word corresponding to the title, the word may be translated into the service determination language.

In OP108, the center server 1 performs service determination in Japanese. In the example illustrated in FIG. 5, the task is "register schedule", and thus, scheduler is selected as the service. Furthermore, because the slots "start date/time: tomorrow at 10:00" and "title: Lepanto" are extracted for the task "register schedule", a schedule "Lepanto, tomorrow at 10:00" is registered. At this time, in the case where English is set as the used language of the scheduler, registration of the schedule is performed in English.

In OP109, the center server 1 detects success of the service of the scheduler (i.e., registration of schedule), and creates text data of a response "明日の予定を登録しました (Registered tomorrow's schedule)". Additionally, the response is created in the service determination language.

In OP110, because the language of the speech is English and the service determination language is Japanese, the center server 1 determines that the language of the speech and the service determination language do not match (OP110: NO).

In OP111, the center server 1 causes the translation server 3 to translate the content of the response in Japanese, which is the service determination language, into English, which is the language of the speech. Text data in English, "Registered tomorrow's schedule", is thus acquired. In OP112, the center server 1 transmits the response to the user terminal 2.

<Advantages and Effects of First Embodiment>

For example, in the example illustrated in FIG. 5, in the case where the content of the speech is analyzed by the intention understanding engine in English, which is the language of the speech (OP105), it is highly likely that "Lepanto" is not recognized as a place name (a station name) in Italy and tagging of the title is not performed. That is, it is highly likely that "Lepanto" is not recognized as corresponding to the slot. In this case, due to there being a missing slot, an inquiry for filling the missing slot, such as "Where is the destination?", is returned to the user terminal 2, or location information (address or the like) of the destination is not registered in the schedule, for example.

Furthermore, for example, in the case where a place name with a same spelling as the name of the destination in Italy exists in another, English-speaking country, because the content of the speech is analyzed by the intention understanding engine in English, which is the language of the speech, information about the place with the same name in the other country is possibly registered in the schedule as the location information of the destination.

With the content of a speech being analyzed by the intention understanding engine in the used language of the country that is indicated by the location information of the user terminal 2 at the time of utterance of the speech, instead of the language of the speech, occurrence of a different understanding of the intention as described above or an erroneous process may be prevented. The accuracy of understanding of the intention of a speech's content may thus be increased. Additionally, according to the first embodiment, not only a word in the content of a speech that corresponds to a slot, but also a word that is a keyword for understanding the intention, such as a word corresponding to a task, may be prevented from being missed, and the accuracy of understanding of the intention may be increased.

Furthermore, in the first embodiment, by using a single language as the language for service determination, the center server 1 does not have to include a plurality of engines for service determination, and resources of the center server 1 may be effectively used.

OTHER EMBODIMENTS

The embodiment described above is an example, and the present disclosure may be changed and carried out as appropriate without departing from the gist of the present disclosure.

In the first embodiment, the first language is identified based on the location information of the user terminal 2, but information used to identify the first language is not limited to the location information of the user terminal 2. For example, the center server 1 may accumulate information indicating preferences for places of the user terminal 2, and may identify the first language based on the information indicating preferences for places. The information indicating preferences for places is a search history for places, destinations in schedule information, a record of push notifications to the user terminal 2, and the like. The center server 1 may create a ranking of appearances of countries based on such information pieces, and may identify the used language of a country selected from top N countries as the first language, for example. Furthermore, for example, the center server 1 may identify the first language based on both the location information of the user terminal 2 and the information indicating preferences for places of the user terminal 2. For example, in the case where the country indicated by the location information of the user terminal 2 is among the top N countries in the ranking of appearances according to the information indicating preferences for places, the center server 1 may identify the language of the country indicated by the location information of the user terminal 2 as the first language.

Moreover, in the first embodiment, the center server 1 includes the intention understanding engine group 14, but the intention understanding engine group 14 may alternatively be provided in an external server.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus comprising:
   a plurality of intention understanding engines corresponding to a plurality of languages, the plurality of intention understanding engines including a plurality of dictionary databases corresponding to the plurality of languages;
   a storage device; and
   a controller configured to:
      accumulate a search history of a first user and a record of delivered information to the first user in the storage device,
      receive audio data of a content of a speech of the first user, the audio data of the content of the speech being transmitted from a first device to which the speech of the first user is input,
      create information indicating a preference of the first user, the information indicating the preference of the first user including a ranking of appearances of countries in at least one of the search history of the first user and the record of delivered information to the first user accumulated in the storage device,
      identify a used language of a country ranking first in the ranking of appearances of countries as a first language into which a content of a speech that is input is to be translated based on the information indicating the preference of the first user,
      convert the audio data of the content of the speech of the first user into text data of the content of the speech of the first user,
      determine whether the first language and a language of the speech of the first user match or not based upon a character code of the text data of the content of the speech of the first user,
      in a case where the first language and the language of the speech of the first user do not match, translate the text data of the content of the speech of the first user into the first language,
      select an intention understanding engine corresponding to the first language from among the plurality of intention understanding engines,
      perform a morphological analysis for the text data of the content of the speech of the first user that is translated into the first language using a dictionary database, of the plurality of dictionary databases, of the intention understanding engine corresponding to the first language,
      extract, from the text data of the content of the speech of the first user to which the morphological analysis is performed, a word corresponding to a task that is an operation desired by the first user and a word corresponding to a slot in which information that is a parameter for the task is stored,
      estimate an intention of the content of the speech of the first user based on the word corresponding to the task and the word corresponding to the slot,
      select a service to be provided based on the intention that is estimated, and
      provide a guide related to the service in the language of the speech of the first user.

2. The information processing apparatus according to claim 1, wherein the controller is configured to:
   translate the intention that is estimated in the first language into a second language that is used to select the service, and
   select the service to be provided based on the intention that is translated into the second language.

3. An information processing method performed by a computer including a plurality of intention understanding engines corresponding to a plurality of languages and a storage device, the plurality of intention understanding engines including a plurality of dictionary databases corresponding to the plurality of languages, the method comprising:
   accumulating a search history of a first user and a record of delivered information to the first user in the storage device,
   receiving audio data of a content of a speech of the first user, the audio data of the content of the speech being transmitted from a first device to which the speech of the first user is input,
   creating information indicating a preference of the first user, the information indicating the preference of the first user including a ranking of appearances of countries in at least one of the search history of the first user and the record of delivered information to the first user accumulated in the storage device,
   identifying a used language of a country ranking first in the ranking of appearances of countries as a first language into which a content of a speech that is input is to be translated based on the information indicating the preference of the first user,
   converting the audio data of the content of the speech of the first user into text data of the content of the speech of the first user,
   determining whether the first language and a language of the speech of the first user match or not based upon a character code of the text data of the content of the speech of the first user,
   in a case where the first language and the language of the speech of the first user do not match, translating the text data of the content of the speech of the first user into the first language,
   selecting an intention understanding engine corresponding to the first language from among the plurality of intention understanding engines,
   perform a morphological analysis for the text data of the content of the speech of the first user that is translated into the first language using a dictionary database, of the plurality of dictionary databases, of the intention understanding engine corresponding to the first language, extracting, from the text data of the content of the speech of the first user to which the morphological analysis is performed, a word corresponding to a task that is an operation desired by the first user and a word corresponding to a slot in which information that is a parameter for the task is stored, estimating an intention of the content of the speech of the first user based on the word corresponding to the task and the word corresponding to the slot, selecting a service to be provided based on the intention that is estimated, and providing a guide related to the service in the language of the speech of the first user.

4. The information processing method according to claim 3, comprising:

translating the intention that is estimated in the first language into a second language that is used to select the service, and selecting the service to be provided based on the intention that is translated into the second language.

5. A computer-readable non-transitory recording medium storing a program for causing a computer to perform the information processing method according to claim 3.

6. A computer-readable non-transitory recording medium stored with a program for causing a computer to:

transmit, to a server, audio data of a content of a speech of a first user that is input, the server including a plurality of intention understanding engines corresponding to a plurality of languages and a storage device, the plurality of intention understanding engines including a plurality of dictionary databases corresponding to the plurality of languages, and receive a guide related to a service in a language of the speech, the guide being transmitted from the server that is configured to accumulate a search history of the first user and a record of delivered information to the first user in the storage device, receive the audio data of the content of the speech of the first user, create information indicating a preference of the first user, the information indicating the preference of the first user including a ranking of appearances of countries in at least one of the search history of the first user and the record of delivered information to the first user accumulated in the storage device, identify a used language of a country ranking first in the ranking of appearances of countries as a first language into which a content of a speech that is input is to be translated based on the information indicating the preference of the first user, convert the audio data of the content of the speech of the first user into text data of the content of the speech of the first user, determine whether the first language and a language of the speech of the first user match or not based upon a character code of the text data of the content of the speech of the first user, in a case where the first language and the language of the speech of the first user do not match, translate the text data of the content of the speech of the first user into the first language, select an intention understanding engine corresponding to the first language from among the plurality of intention understanding engines, perform a morphological analysis for the text data of the content of the speech of the first user that is translated into the first language using a dictionary database, of the plurality of dictionary databases, of the intention understanding engine corresponding to the first language, extract, from the text data of the content of the speech of the first user to which the morphological analysis is performed, a word corresponding to a task that is an operation desired by the first user and a word corresponding to a slot in which information that is a parameter for the task is stored, estimate an intention of the content of the speech of the first user based on the word corresponding to the task and the word corresponding to the slot, and select the service based on the intention that is estimated.

* * * * *